(12) United States Patent
Noritake

(10) Patent No.: US 12,529,635 B2
(45) Date of Patent: Jan. 20, 2026

(54) THERMAL ANALYSIS APPARATUS

(71) Applicant: RIGAKU CORPORATION, Akishima (JP)

(72) Inventor: Koichiro Noritake, Tokyo (JP)

(73) Assignee: RIGAKU CORPORATION, Tokyo (JP)

( * ) Notice: Subject to any disclaimer, the term of this patent is extended or adjusted under 35 U.S.C. 154(b) by 261 days.

(21) Appl. No.: 18/241,342

(22) Filed: Sep. 1, 2023

(65) Prior Publication Data

US 2024/0077396 A1    Mar. 7, 2024

(30) Foreign Application Priority Data

Sep. 2, 2022    (JP) ................................. 2022-139845

(51) Int. Cl.
| | |
|---|---|
| *G01N 7/16* | (2006.01) |
| *G01N 1/40* | (2006.01) |
| *G01N 33/00* | (2006.01) |
| G01N 30/00 | (2006.01) |
| G01N 30/08 | (2006.01) |
| G01N 30/12 | (2006.01) |

(52) U.S. Cl.
CPC ............... *G01N 7/16* (2013.01); *G01N 1/405* (2013.01); *G01N 33/0009* (2013.01); *G01N 33/0021* (2013.01); *G01N 2030/008* (2013.01); *G01N 2030/085* (2013.01); *G01N 2030/128* (2013.01)

(58) Field of Classification Search
CPC .... G01N 7/16; G01N 1/405; G01N 2030/085; G01N 2030/128; G01N 2030/008; G01N 33/0009; G01N 33/0021
See application file for complete search history.

(56) References Cited

U.S. PATENT DOCUMENTS

2005/0086997 A1*    4/2005    Arii .................... H01J 49/24
                                                              73/25.01

FOREIGN PATENT DOCUMENTS

| | | | | |
|---|---|---|---|---|
| CN | 107655637 A | * | 2/2018 | ............ G01M 3/26 |
| EP | 3438659 A1 | | 2/2019 | |
| GB | 1439469 A | | 6/1976 | |

(Continued)

OTHER PUBLICATIONS

Extended European Search Report dated Dec. 22, 2023, issued in counterpart EP application No. 23194215.2. (8 pages).

(Continued)

*Primary Examiner* — Paul M. West
(74) *Attorney, Agent, or Firm* — WHDA, LLP

(57) ABSTRACT

A configuration is provided in which outside air is taken as a carrier gas into a carrier gas flow path (A, B). A $CO_2$ sensor (specific gas detection sensor) (71) for detecting a $CO_2$ gas desorbed from a sample is installed in a component gas detector (70). A $CO_2$ sensor (air-containing specific gas detection sensor) (54) for detecting a $CO_2$ gas contained in air taken into the carrier gas flow path by a blower fan (51) is installed separately. A $CO_2$ gas detection amount detected by the air-containing specific gas detection sensor (54) is subtracted from a $CO_2$ gas detection amount detected by the specific gas detection sensor (71) to calculate a detection amount of the $CO_2$ gas desorbed from the sample.

6 Claims, 3 Drawing Sheets

(56) References Cited

FOREIGN PATENT DOCUMENTS

JP         S56-44825 A     4/1981
JP     2011-232108 A   11/2011

OTHER PUBLICATIONS

"Build a decarbonized society with concrete and cement!? Recycling resources and CO2 through technological innovation", Agency for Natural Resources and Energy, Ministry of Economy, Trade and Industry, Dec. 15, 2021, Retrieved from the Internet on Aug. 27, 2022: <URL:https://www.enecho.meti.go.jp/about/special/johoteikyo/concrete_cement.html>, cited in Specification of priority JP Application 2022-139845, w/English translation (15 pages).

Office Action dated Ocotber 21, 2025, issued in counterpart EP Application No. 23194215.2. (5 pages).

\* cited by examiner

THERMAL ANALYSIS APPARATUS

FIELD OF THE INVENTION

The present invention relates to a thermal analysis apparatus having a function of analyzing a state change when a sample is heated, and analyzing gas desorbed from the sample due to heating.

BACKGROUND OF THE INVENTION

In order to meet the demands of global warming mitigation measures, efforts (carbon neutrality) for reducing emissions of greenhouse gases such as $CO_2$ (carbon dioxide) as much as possible have been recently made in various industrial fields.

For example, in the cement industry, a large amount of $CO_2$ is generated during cement manufacturing, and in order to reduce emissions of $CO_2$ into the atmosphere, a technology development for causing concrete to absorb $CO_2$ generated during cement manufacturing and using the $CO_2$-absorbed concrete has progressed.

Here, in order to verify the results of technology development for causing concrete to absorb $CO_2$, a technique for analyzing how much $CO_2$ is contained in manufactured concrete is required.

A thermal analysis apparatus is known as an analysis apparatus for analyzing the amount of components contained in a sample. Conventional thermal analysis apparatuses have been developed on the assumption that minute samples of about several milligrams to several hundred milligrams are targeted as an object to be analyzed, and they have configured to have specifications for detecting component gases of about several milligrams to several hundred milligrams desorbed from heated samples (see, for example, Japanese Patent Laid-Open No. 2011-232108).

Concrete for which the above technology development has been progressing has obtained by mixing aggregate such as gravel and crushed stone with cement which is a main raw material. Therefore, when minute concrete is used as a sample, the mixing ratio of the cement and the aggregate greatly varies according to each sample. As a result, the amount of desorbed gas ($CO_2$) to be detected varies from sample to sample, and it is impossible to expect highly accurate qualitative analysis of desorbed gas.

Therefore, there has been a demand for the development of an apparatus capable of performing highly accurate thermal analysis on samples as analysis targets that are much heavier (for example, several kilograms) than samples targeted by conventional thermal analysis apparatuses. By increasing the size of a sample, even if large solid components are randomly mixed in the sample, the mixing ratio of all the components is homogenized, which enables highly accurate qualitative analysis of the desorbed gas.

On the other hand, as the size of the sample increases, the amount of gas desorbed from the sample inevitably increases. Therefore, it is necessary to develop a technique for analyzing the large amount of desorbed gas with high accuracy.

SUMMARY OF THE INVENTION

The present invention has been made in view of the above-mentioned circumstances, and has an object to provide a thermal analysis apparatus that can quickly and accurately detect a large amount of component gases desorbed from a sample by heating a sample of a large weight which exceeds at least 100 grams.

In order to attain the above object, according to the present invention, a thermal analysis apparatus including a heating furnace for heating a sample placed therein, a component gas detector for detecting a component gas desorbed from the sample by heating, and a carrier gas flow path for carrying the component gas desorbed from the sample inside the heating furnace to the component gas detector by a carrier gas, comprises:

an air intake unit for taking in outside air as a carrier gas into the carrier gas flow path;

a specific gas detection sensor that is provided in the component gas detector and detects a specific component gas desorbed from the sample; and an air-containing specific gas detection sensor for detecting the same gas as a specific component gas to be detected by the specific gas detection sensor from the air taken into the carrier gas flow path by the air intake unit, wherein a gas detection amount detected by the air-containing specific gas detection sensor is subtracted from a gas detection amount detected by the specific gas detection sensor to detect a detection amount of the specific component gas desorbed from the sample.

In the present invention, the carrier gas flow path comprises:

a heating-furnace internal passing flow path that has a gas supply port and a gas exhaust port, supplies the carrier gas from the gas supply port into the heating furnace, passes the carrier gas through an inside of the heating furnace in which the sample is placed, and exhausts the carrier gas from the gas exhaust port; and a heating-furnace external passing flow path that passes through an outside of the heating furnace and reaches the component gas detector, and the gas exhaust port of the heating-furnace internal passing flow path communicates with the heating-furnace external passing flow path.

In the present invention, the thermal analysis apparatus further comprises a housing in which the heating furnace is installed, and the housing is provided with each of the gas supply port in the heating-furnace internal passing flow path and a gas supply port for supplying the carrier gas to the heating-furnace external passing flow path.

In the present invention, the heating-furnace external passing flow path is configured to cause a carrier gas of a larger flow rate (volume or mass of gas flowing per unit time) to flow to the component gas detector than the heating-furnace internal passing flow path.

In the present invention, the thermal analysis apparatus further comprises:

a gas flowmeter for measuring a flow rate of the carrier gas flowing into the component gas detector; and a gas flow rate adjuster for adjusting the flow rate of the carrier gas flowing into the component gas detector.

In the present invention, the thermal analysis apparatus further comprises a heater for restraining solidification of a gas carried from the heating-furnace external passing flow path to the component gas detector.

DETAILED DESCRIPTION OF EMBODIMENT

Hereinafter, an embodiment of the present invention will be described in detail with reference to the drawings. The present embodiment shows a configuration example for detecting the amount of $CO_2$ gas desorbed from concrete by heating, the concrete having absorbed a large amount of $CO_2$ and being targeted as an object to be analyzed. A sample S is assumed to be a concrete block having a large weight of, for example, about 3 to 5 kg, but is not limited to this.

According to experiments conducted by the inventors of the present application, it was found that a $CO_2$ gas of about 300 L was desorbed from a sample S when a concrete block of 3.5 kg as the sample S was heated up to 1000° C. and kept in an overheated state. At the same time, it was also found that a large amount of $H_2O$ (water vapor) was desorbed from the sample S.

The thermal analysis apparatus of the present embodiment is configured to be capable of quickly and highly accurately detecting the amount of $CO_2$ gas desorbed from the sample S in large quantities, and restraining dew condensation of water vapor desorbed from the sample S in the apparatus.

Figure 1:
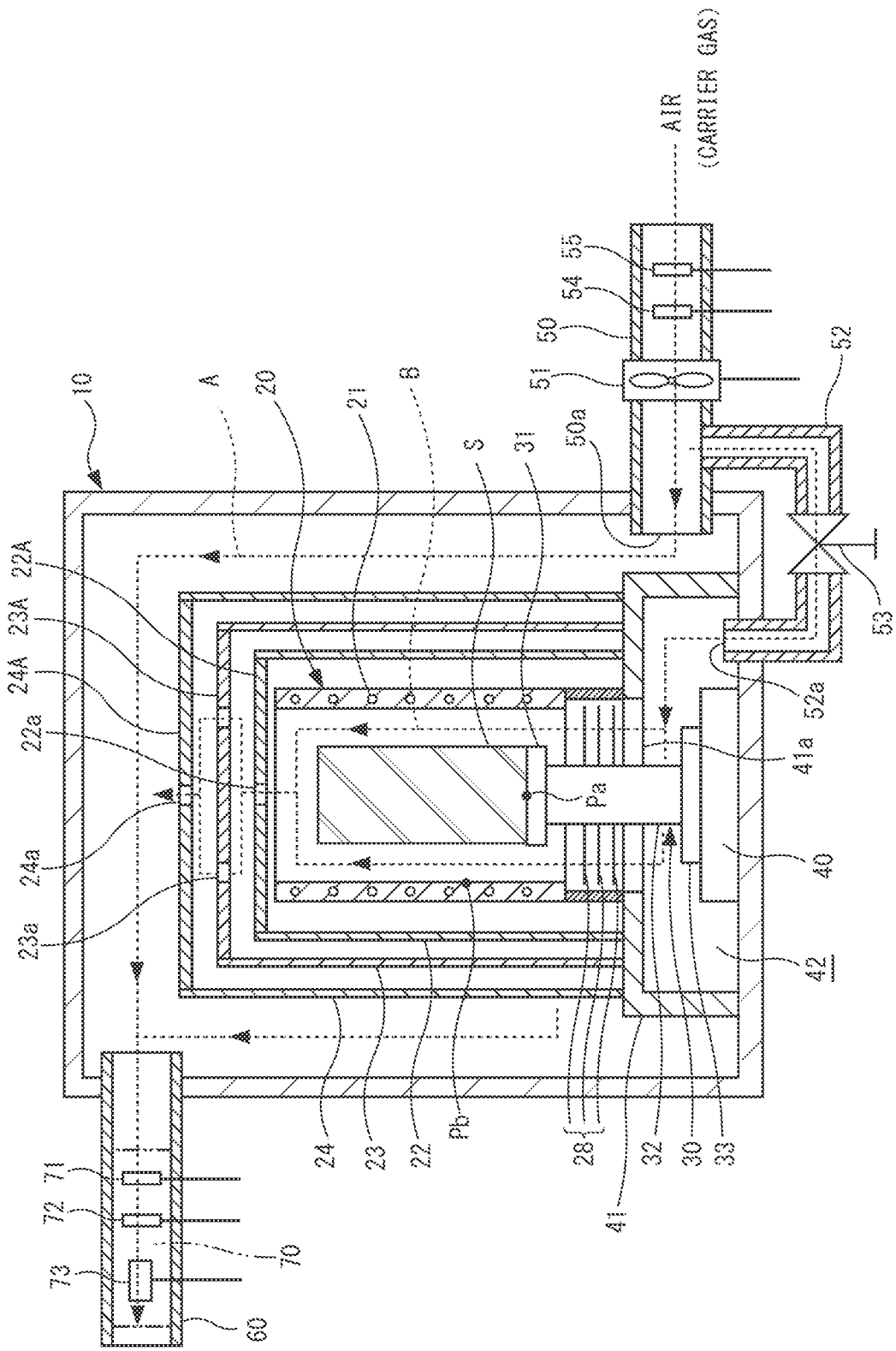
FIG. 1 is a schematic diagram showing an overall structure of a thermal analysis apparatus according to an embodiment of the present invention.

FIG. 1 is a schematic diagram showing an overall structure of a thermal analysis apparatus according to the present embodiment.

The thermal analysis apparatus includes a housing 10, a heating furnace 20, a sample stage 30, and a weighing instrument 40.

The housing 10 is a casing through which the inside and outside of the apparatus is partitioned, and the heating furnace 20 is installed in the internal space of this housing 10. The heating furnace 20 has a cylindrical heat source (heater) 21, and heats the sample S placed inside the heat source 21 from the surroundings.

Further, three cylindrical partition cylinders are arranged in a triple structure around the heating furnace 20. In other words, the partition cylinder includes an inner partition cylinder 22, a middle partition cylinder 23, and an outer partition cylinder 24, and is configured so that the inner partition cylinder 22 is installed around the heating furnace 20, the inner partition cylinder 22 is surrounded by the middle partition cylinder 23, and the middle partition cylinder 23 is surrounded by the outer partition cylinder 24. These partition cylinders 22, 23, and 24 are made of heat-resistant alloy such as stainless steel or Fe—Cr—Al, and provided to block the heat from the heating furnace 20 and efficiently increase the temperature of the inside of the heating furnace 20.

The upper end surfaces of the partition cylinders 22, 23, and 24 are open, and the openings thereof are blocked by lids 22A, 23A, and 24A which are also made of a heat-resistant alloy. The lids 22A, 23A and 24A are freely detachable, and the sample S can be exchanged by detaching these lids 22A, 23A, and 24A. Although not shown in the figures, the housing 10 is also provided with an opening/closing door for exchanging the sample S.

Gas delivery holes 22a, 23a, and 24a are provided in the lids 22A, 23A, and 24A respectively, and have a function of sending out a carrier gas supplied into the heating furnace 20 to the outside of the heating furnace 20 (the internal space of the housing 10) as described later.

The sample stage 30 has a disk-shaped sample placement portion 31 formed at an upper end portion thereof, and a support pole 32 extends downward from a center portion of a lower end surface of the sample placement portion 31. A sample S as an object to be analyzed is placed on the upper surface of the sample placement portion 31, and arranged in the central portion inside the heating furnace 20.

The sample S is prepared, for example, by molding the concrete as an object to be analyzed into a cylindrical block having a preset weight.

A support plate 33 is formed at the lower end of the support pole 32. The support pole 32 is made of a material having low thermal conductivity, and even when the sample placement portion 31 is heated in the heating furnace 20, the support pole 32 restrains the heat from being transferred to the support plate 33. The support pole 32 is supported by a bearing structure (not shown) in a state where movement thereof in a vertical direction is not restricted.

Here, a thermocouple (not shown) is provided at each of a sample temperature measurement point Pa set in the sample placement portion 31 and an in-furnace temperature measurement point Pb set in or near the heat source 21 inside the heating furnace 20, and the temperature at each of the temperature measurement points is measured by each thermocouple.

The weighing instrument 40 is installed below the heating furnace 20, and the support plate 33 of the sample stage 30 is mounted on a measuring unit of the weighing instrument 40. For example, a weighing balance is used as the weighing instrument 40 to measure the weight of the sample S placed on the sample placement portion 31 of the sample stage 30.

The weighing instrument 40 is arranged inside a weighing chamber 42 surrounded by a partition wall 41. An opening portion 41a is formed in the ceiling of the weighing chamber 42, and the weighing chamber 42 communicates with the interior of the heating furnace 20 through the opening portion 41a. Inside the heating furnace 20, a plurality of disk-shaped convection preventing plates 28 are provided in a lower region near the opening portion 41a of the weighing chamber 42 so as to be arranged side by side in an axial direction. The convection preventing plates 28 are also made of a heat-resistant alloy like the partition cylinders 22, 23 and 24.

A gap is formed between the outer peripheral edge of each convection preventing plate 28 and the inner peripheral surface of the heating furnace 20. As described later, the carrier gas supplied to the weighing chamber 42 flows into the heating furnace 20 through this gap.

Next, a carrier gas supply pipe (gas supply pipe 50) and a carrier gas exhaust pipe (gas exhaust pipe 60) are connected to the housing 10. Respective hollow portions of both the gas supply pipe 50 and the gas exhaust pipe 60 communicate with the internal space of the housing 10.

A component gas detector 70 for detecting component gases desorbed from the sample S in the heating furnace 20 is provided at an intermediate portion of the gas exhaust pipe 60. A gas sensor is installed in the component gas detector 70. The component gas detector 70 is configured so that the amounts of the component gases carried through the hollow portion of the gas exhaust pipe 60 can be sequentially detected by the gas sensor.

In the present embodiment, when the concrete as the sample S is heated, large amounts of component gases of $CO_2$ and $H_2O$ (water vapor) contained in the concrete are desorbed. Therefore, the component gas detector 70 is provided with a $CO_2$ sensor 71 and an $H_2O$ sensor 72 to detect the amounts of these component gases.

The $CO_2$ sensor 71 has a function of detecting $CO_2$ contained in the carrier gas carried through the hollow portion of the gas exhaust pipe 60 and sequentially outputting a detected amount per unit time.

Further, the $H_2O$ sensor 72 has a function of detecting $H_2O$ contained in the carrier gas carried through the hollow portion of the gas exhaust pipe 60, and sequentially outputting a detected amount per unit time. The $H_2O$ sensor 72 may be a humidity sensor for converting the amount of $H_2O$ into humidity and outputs the converted humidity.

Further, a blower fan 51 (air intake unit) such as a sirocco fan is provided at an intermediate portion of the gas supply pipe 50. The gas supply pipe 50 is configured so that outside air is taken into the hollow portion of the gas supply pipe 50 by the blower fan 51 and supplied to the internal space of the housing 10 through the gas supply pipe 50.

In the present embodiment, the air existing outside the apparatus is used as the carrier gas.

As mentioned above, when concrete as a sample S is heated, large amounts of component gases ($CO_2$ and $H_2O$) desorb from the sample S. A large amount of carrier gas is required to quickly carry the large amounts of desorbed component gases to the component gas detector 70. In general, the carrier gas to be used in the thermal analysis apparatus is an inert gas such as nitrogen gas ($N_2$), but it needs an extremely high cost to supply such an inert gas in quantities and continuously. Therefore, in the present embodiment, the air existing outside the apparatus is used as the carrier gas, whereby a thermal analysis apparatus with a low operating cost and an excellent economic efficiency has been implemented.

Further, a branch pipe 52 is connected to the gas supply pipe 50. The terminal end of this branch pipe 52 is connected to the housing 10, and communicates with the inside of the weighing chamber 42. A part of the air (carrier gas) taken into the hollow portion of the gas supply pipe 50 by the blower fan 51 is supplied to the weighing chamber 42.

Here, the hollow portion of the branch pipe 52 has a cross-sectional area smaller than that of the hollow portion of the gas supply pipe 50, so that the flow rate of air (carrier gas) to be sent into the branch pipe 52 is smaller than the flow rate of air (carrier gas) flowing through the gas supply pipe 50. For example, it is preferable to provide a structure in which when air (carrier gas) of about 1000 L/min is taken into the gas supply pipe 50, air (carrier gas) of about 5 L/min is set to flow into the branch pipe 52.

Further, a flow rate control valve 53 is provided at an intermediate portion of the branch pipe 52, and the structure is set such that the flow rate of air (carrier gas) flowing through the branch pipe 52 can be arbitrarily adjusted by the flow rate control valve 53.

In the present embodiment, a path that passes from the gas supply pipe 50 through the internal space of the housing 10 and reaches the gas exhaust pipe 60 forms a heating-furnace external passing flow path A that passes through the outside of the heating furnace 20 and reaches the component gas detector 70. Here, a connecting portion of the gas supply pipe 50 in the housing 10 forms a gas supply port 50a of the heating-furnace external passing flow path A.

Further, a path that passes from the branch pipe 52 through the weighing chamber 42, the inside of the heating furnace 20, and the gas delivery holes 22a, 23a, and 24a of the lids 22A, 23A, and 24A forms a heating-furnace internal passing flow path B. Here, a connecting portion of the branch pipe 52 communicating with the gas supply pipe 50 in the housing 10 forms a gas supply port 52a of the heating-furnace internal passing flow path B, and the gas delivery hole 24a provided in the lid for blocking the upper end opening of the outer partition cylinder 24 forms a gas exhaust port of the heating-furnace internal passing flow path B. The gas delivery hole 24a forming the gas exhaust port communicates with the internal space of the housing 10. In other words, the gas exhaust port of the heating-furnace internal passing flow path B communicates with the heating-furnace external passing flow path A, and the carrier gas containing the component gases desorbed from the sample S inside the heating furnace 20 is sent out from the gas delivery hole 24a (gas exhaust port) to the heating-furnace external passing flow path A, joins the carrier gas flowing through the heating-furnace external passing flow path A, and flows to the component gas detector 70.

As described above, in the present embodiment, the heating-furnace external passing flow path A and the heating-furnace internal passing flow path B form a carrier gas flow path, and the component gases desorbed from the sample S inside the heating furnace 20 are carried to the component gas detector 70 by the carrier gas flowing through these flow paths A and B.

Here, the heating-furnace external passing flow path A is configured to cause the carrier gas of a large flow rate (at least 10 L/min or more) to flow to the component gas detector 70 in order to quickly carry the component gases desorbed in quantities from the sample S without stagnation. As a result, the amount of the component gas desorbed from the sample S can be detected quickly and with high accuracy.

Further, in the present embodiment, a large amount of $H_2O$ gas (water vapor) is desorbed from the concrete as an object to be analyzed by heating. Therefore, if this $H_2O$ gas (water vapor) stagnates in the internal space of the housing 10, the component gas detector 70 or the like, dew condensation occurs on the inner wall of the housing 10, the sensors 71 and 72 provided in the component gas detector 70, or the like, which causes a risk that the inner wall of the housing 10 corrodes or the detection accuracy of the component gases by the respective sensors 71 and 72 is deteriorated.

However, as described above, in the present embodiment, a large amount of the component gas desorbed from the sample S is quickly carried to the component gas detector 70 through the heating-furnace external passing flow path A without stagnation of the component gas, so that it is possible to avoid occurrence of these problems caused by the dew condensation.

For example, in the case where the amount of desorbed gas is large as in the case of concrete as an object to be analyzed in the embodiment, it is preferable that a carrier gas of 100 L/min or more is caused to flow from the heating-furnace external passing flow path A to the component gas detector 70.

On the other hand, if a large flow rate of carrier gas is caused to flow through the heating-furnace internal passing flow path B, the inside of the heating furnace 20 would be cooled by the carrier gas, which causes a risk that it is impossible to stably perform thermal analysis according to a preset temperature program, so that highly accurate analysis data cannot be obtained.

Therefore, in the present embodiment, a carrier gas having a smaller flow rate per unit time than that in the heating-furnace external passing flow path A is caused to flow through the heating-furnace internal passing flow path B. As a result, it is possible to avoid the inconvenience of cooling the inside of the heating furnace 20 by the carrier gas and perform highly accurate thermal analysis.

Inside the heating furnace 20, the component gases desorbed from the sample S are mixed with the carrier gas flowing from the weighing chamber 42, resulting in increase of the gas volume. Therefore, the carrier gas containing the component gases is vigorously ejected from the gas delivery hole 24a forming the gas exhaust port, which causes a risk of disturbing smooth flow of the carrier gas flowing to the component gas detector 70 in the heating-furnace external passing flow path A.

Figure 2:
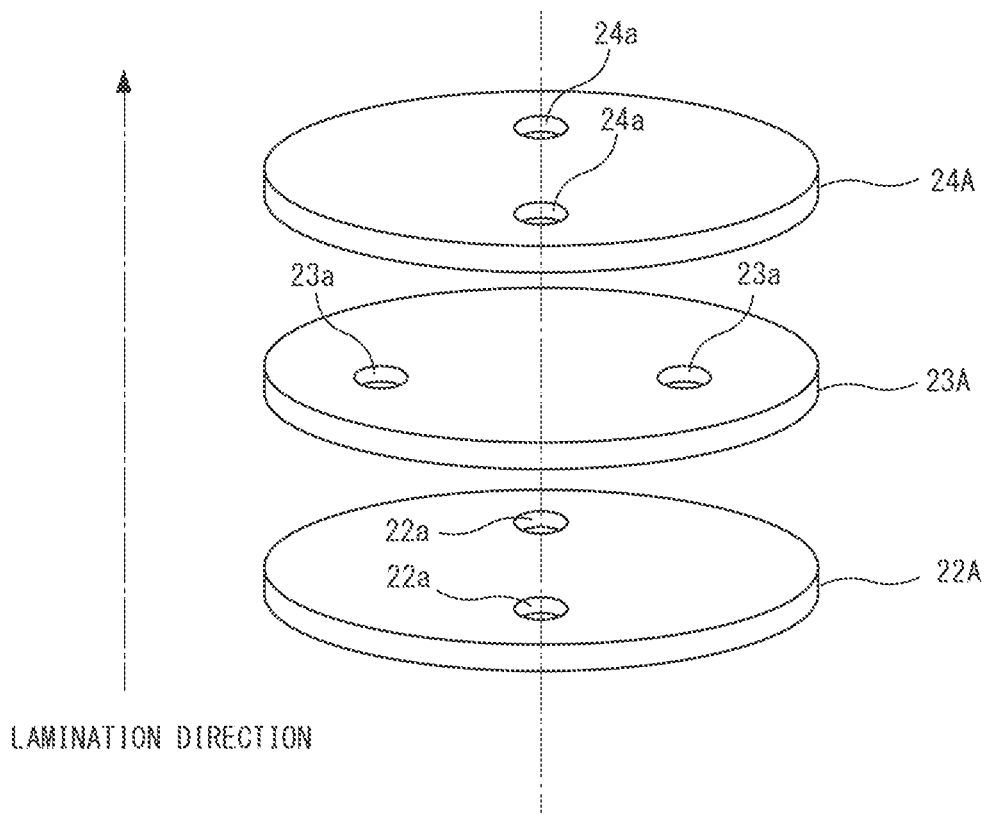
FIG. 2 is a perspective view showing an arrangement of through-holes provided in a lid of each partition cylinder.

Therefore, in the present embodiment, as shown in FIG. 2, the gas delivery holes 22a, 23a, and 24a provided in the respective lids 22A, 23A, and 24A are formed at positions which are displaced from each other in the circumferential direction between the respective adjacent lids (the lid 22A and the lid 23A, and the lid 23A and the lid 24A) with respect to the lamination direction of the lids. As a result, the carrier gas temporarily stagnates in the space between the respective lids 22A, 23A, and 24A, so that the ejection amount of the carrier gas containing the component gases from the gas delivery hole 24a forming the gas exhaust port is restrained, and the carrier gas can be gently sent out into the heating-furnace external passing flow path A.

In the structure shown in FIG. 2, the lids 22A, 23A, and 24A are respectively provided with pairs of respective two gas delivery holes 22a, 23a, and 24a such that the gas delivery holes of each lid are arranged to be opposed to each other with the center of the lid being located therebetween, and the pairs of respective two gas delivery holes are arranged so as to be angularly displaced from one another by 90 degrees. However, the present invention is not limited to this structure, and it is also possible to adjust the ejection amount to a desired amount by changing the shape and number of the holes or the amount of displacement among the upper and lower holes.

In the present embodiment, the component gas detector 70 is provided with a gas flowmeter 73 for measuring the flow rate of the carrier gas. In an adjustment work to be executed when the apparatus is started, the flow rate of the carrier gas flowing to the component gas detector 70 is measured by the gas flowmeter 73, and the blower fan 51 is adjusted so that the measurement result reaches a specified flow rate. This makes it possible to repetitively acquire thermal analysis data under the same condition. The blower fan 51 functions not only as an air intake unit, but also as a gas flow rate adjuster for adjusting the flow rate of the carrier gas flowing to the component gas detector 70.

It is also possible to measure the flow rate of the carrier gas flowing to the component gas detector 70 with the gas flowmeter 73 even while the thermal analysis is being performed, and perform feedback control on the blower fan 51 so that the flow rate is constant.

Furthermore, in the present embodiment, a $CO_2$ sensor 54 is also installed at an upstream side of the connecting portion of the branch pipe 52 inside the hollow portion of the gas supply pipe 50.

The $CO_2$ sensor 71 provided in the component gas detector 70 functions as a specific gas detection sensor for detecting a specific component gas desorbed from the sample S. The $CO_2$ sensor 54 installed in the hollow portion of the gas supply pipe 50 functions as an air-containing specific gas detection sensor for detecting the same gas as the specific component gas (here, $CO_2$) as an object to be detected by the specific gas detection sensor for air to be taken in from the outside.

In the present embodiment in which the outside air is used as the carrier gas, $CO_2$ which is a component gas desorbed from the sample S is also mixed in the air taken in from the outside as the carrier gas. The mixing amount varies depending on the concentration of $CO_2$ in the air existing outside the apparatus.

If the same gas as the component gas to be detected (that is, $CO_2$) is mixed in the air to be used as the carrier gas, the $CO_2$ sensor 71 provided in the component gas detector 70 detects not only $CO_2$ as the component gas desorbed from the sample S which should be originally detected, but also $CO_2$ in the carrier gas taken in from the outside, which causes occurrence of an error in detection data.

Therefore, in the present embodiment, the detection amount of $CO_2$ gas detected by the $CO_2$ sensor 54 installed in the hollow portion of the gas supply pipe 50 is subtracted from the detection amount of $CO_2$ gas detected by the $CO_2$ sensor 71 provided in the component gas detector 70, thereby calculating the amount of $CO_2$ gas desorbed from the sample S without error.

In the present embodiment, an $H_2O$ sensor 55 is also installed at an upstream side of the connecting portion of the branch pipe 52 inside the hollow portion of the gas supply pipe 50. The detection amount of an $H_2O$ gas (water vapor) detected by the $H_2O$ sensor 55 installed in the hollow portion of the gas supply pipe 50 is subtracted from the detection amount of an $H_2O$ gas (water vapor) detected by the $H_2O$ sensor 72 provided in the component gas detector 70, thereby calculating the amount of an $H_2O$ gas (water vapor) desorbed from the sample S without error.

The thermal analysis apparatus configured as described above takes in air as a carrier gas from the gas supply pipe 50, and branches and supplies the carrier gas into the heating-furnace external passing flow path A and the heating-furnace internal passing flow path B through branching.

In the heating furnace 20, a $CO_2$ gas is desorbed as a component gas desorbed from the sample S by heating the sample S (concrete). At the same time, other component gases such as $H_2O$ gas (water vapor) contained in the sample S are also desorbed from the sample S. The thermal analysis apparatus of the present embodiment is configured such that the $CO_2$ gas and the $H_2O$ gas (water vapor) out of these desorbed gases are selected as specific component gases as objects to be detected, and these component gases are detected by the $CO_2$ sensor 71 and the $H_2O$ sensor 72 provided in the component gas detector 70. However, the thermal analysis apparatus of the present embodiment may be configured such that other desorbed gases can also be detected.

The component gases ($CO_2$ gas, $H_2O$ gas, etc.) desorbed from the sample S inside the heating furnace 20 are carried by the carrier gas flowing through the heating-furnace internal passing flow path B, and delivered from the gas delivery hole 24a as the gas exhaust port of the heating-furnace internal passing flow path B to the heating-furnace external passing flow path A. The component gases are carried to the component gas detector 70 by a large amount of carrier gas flowing in the heating-furnace external passing flow path A.

Among the component gases which have reached the component gas detector 70, the amount of the $CO_2$ gas as a detection target is detected by the $CO_2$ sensor 71, and the amount of the $H_2O$ gas is detected by the $H_2O$ sensor 72.

Note that the present invention is not limited to the above-described embodiment, and it goes without saying that various modifications and applications are possible within the scope of the invention described in the claims.

For example, in the above-described embodiment, air is taken in as a carrier gas from the outside of the apparatus, but an inert gas such as nitrogen gas can also be used as a carrier gas.

Further, the thermal analysis apparatus of the above-described embodiment is configured such that air (carrier gas) is supplied to the weighing chamber 42 via the branch pipe 52, but it may be configured such that an opening is provided in the partition wall 41 of the weighing chamber 42, and a part of air (carrier gas) supplied to the internal space of the housing 10 by the gas supply pipe 50 is taken into the weighing chamber 42 through the opening thereof.

In this configuration, an opening and closing window is attached to the opening provided in the partition wall 41 such that an opening amount can be arbitrarily adjusted by the opening and closing window, whereby it is possible to adjust the inflow amount of the carrier gas into the weighing chamber 42.

The thermal analysis apparatus of the above-described embodiment is configured such that the outside air is taken in by the blower fan 51 provided in the gas supply pipe 50, but it may be configured such that gas suction means (air intake unit) such as a blower fan or a suction pump is provided on the gas exhaust pipe 60 side, and the outside air is taken into the gas supply pipe 50 by the suction force of the gas suction means. On the gas supply pipe 50 side as well, not only the blower fan 51, but also various types of air intake units such as a suction pump may be used to take in air.

The thermal analysis apparatus of the above-described embodiment is configured such that the carrier gas flow path is constituted by the two paths of the heating-furnace external passing flow path A and the heating-furnace internal passing flow path B. However, when the amount of gas desorbed from the sample is small, the thermal analysis apparatus of the embodiment may be configured such that the carrier gas flow path is constituted by a single path passing through the inside of the heating furnace.

Figure 3:
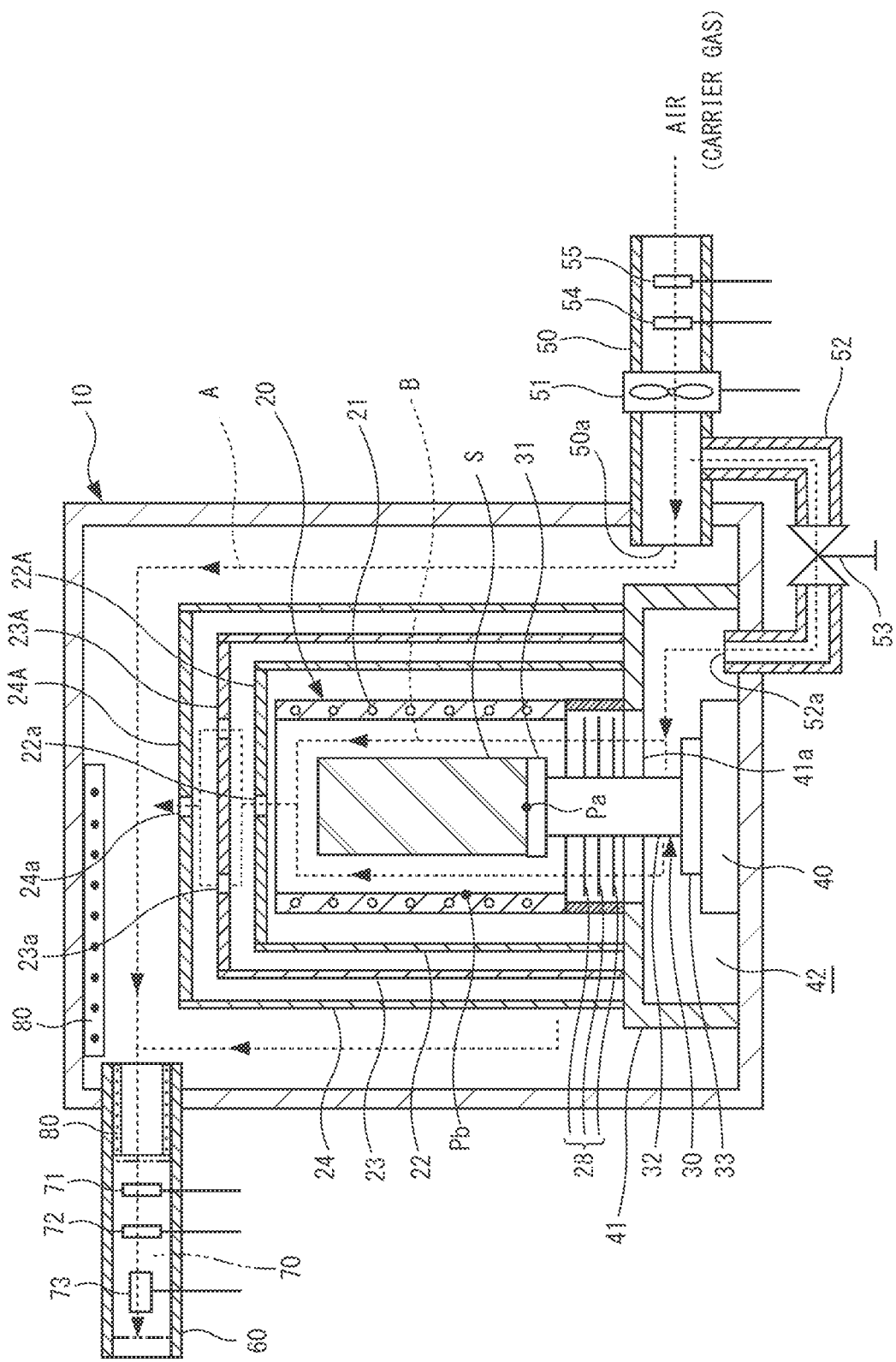
FIG. 3 is a schematic diagram showing a configuration example of the thermal analysis apparatus in which a gas dryer is installed.

Further, as shown in FIG. 3, a heater 80 configured by a panel heater, an electric heating wire heater, an infrared heater, or the like can be installed at a necessary location such as the inside of the housing 10 or the inside of the hollow portion of the gas exhaust pipe 60. Dew condensation (solidification) of $H_2O$ gas (water vapor) contained in the carrier gas and the desorbed gas from the sample S is restrained by the heater 80, whereby it is possible to avoid corrosion of the inner wall of the housing 10 and deterioration in detection accuracy of the component gases by the respective sensors provided in the component gas detector 70.

The invention claimed is:

1. A thermal analysis apparatus including a heating furnace for heating a sample placed therein, a component gas detector for detecting a component gas desorbed from the sample by heating, and a carrier gas flow path for carrying the component gas desorbed from the sample inside the heating furnace to the component gas detector by a carrier gas, comprising:
    an air intake unit for taking in outside air as a carrier gas into the carrier gas flow path;
    a specific gas detection sensor that is provided in the component gas detector and detects a specific component gas desorbed from the sample; and
    an air-containing specific gas detection sensor for detecting the same gas as a specific component gas to be detected by the specific gas detection sensor from the air taken into the carrier gas flow path by the air intake unit, wherein a gas detection amount detected by the air-containing specific gas detection sensor is subtracted from a gas detection amount detected by the specific gas detection sensor to detect a detection amount of the specific component gas desorbed from the sample.

2. The thermal analysis apparatus according to claim 1, wherein the carrier gas flow path comprises:
    a heating-furnace internal passing flow path that has a gas supply port and a gas exhaust port, supplies the carrier gas from the gas supply port into the heating furnace, passes the carrier gas through an inside of the heating furnace in which the sample is placed, and exhausts the carrier gas from the gas exhaust port; and
    a heating-furnace external passing flow path that passes through an outside of the heating furnace and reaches the component gas detector, and
    the gas exhaust port of the heating-furnace internal passing flow path communicates with the heating-furnace external passing flow path.

3. The thermal analysis apparatus according to claim 2, further comprising a housing in which the heating furnace is installed, and the housing is provided with each of the gas supply port in the heating-furnace internal passing flow path and a gas supply port for supplying the carrier gas to the heating-furnace external passing flow path.

4. The thermal analysis apparatus according to claim 2, wherein the heating-furnace external passing flow path is configured to cause a carrier gas of a larger flow rate to flow to the component gas detector than the heating-furnace internal passing flow path.

5. The thermal analysis apparatus according to claim 2, further comprising a heater for restraining solidification of a gas carried from the heating-furnace external passing flow path to the component gas detector.

6. The thermal analysis apparatus according to claim 1, further comprising:
    a gas flowmeter for measuring a flow rate of the carrier gas flowing into the component gas detector; and
    a gas flow rate adjuster for adjusting the flow rate of the carrier gas flowing into the component gas detector.

* * * * *